United States Patent
Gu et al.

(10) Patent No.: US 12,424,907 B2
(45) Date of Patent: Sep. 23, 2025

(54) OIL-COOLED MOTOR COOLING SYSTEM, AND VEHICLE

(71) Applicant: CHERY AUTOMOBILE CO., LTD., Wuhu (CN)

(72) Inventors: Cunxing Gu, Wuhu (CN); Lizhen Geng, Wuhu (CN); Zhiguang Zhou, Wuhu (CN); Yanan Li, Wuhu (CN)

(73) Assignee: CHERY AUTOMOBILE CO., LTD., Wuhu (CN)

( * ) Notice: Subject to any disclaimer, the term of this patent is extended or adjusted under 35 U.S.C. 154(b) by 155 days.

(21) Appl. No.: 18/257,434

(22) PCT Filed: Oct. 12, 2021

(86) PCT No.: PCT/CN2021/123354
§ 371 (c)(1),
(2) Date: Jun. 14, 2023

(87) PCT Pub. No.: WO2022/134746
PCT Pub. Date: Jun. 30, 2022

(65) Prior Publication Data
US 2024/0258881 A1 Aug. 1, 2024

(30) Foreign Application Priority Data
Dec. 25, 2020 (CN) .......................... 202011562372.5

(51) Int. Cl.
*H02K 1/32* (2006.01)
*H02K 3/24* (2006.01)
(Continued)

(52) U.S. Cl.
CPC ..................................... *H02K 9/19* (2013.01)

(58) Field of Classification Search
CPC .. H02K 1/20; H02K 1/32; H02K 3/24; H02K 5/20; H02K 7/00; H02K 7/08;
(Continued)

(56) References Cited

U.S. PATENT DOCUMENTS 7,307,363 B2 * 12/2007 Pashnik ................. B60L 50/16
310/52
7,456,536 B2 * 11/2008 Tanaka ................ F16C 33/6677
310/90

(Continued)

FOREIGN PATENT DOCUMENTS

CA       2116900 A1    9/1995
CN     106160277 A    11/2016
(Continued)

OTHER PUBLICATIONS

International Search Report of the International Searching Authority for State Intellectual Property Office of the People's Republic of China in PCT application No. PCT/CN2021/123354 issued on Dec. 29, 2021, which is an international application to which this application claims priority.

(Continued)

*Primary Examiner* — Edgardo San Martin
(74) *Attorney, Agent, or Firm* — Kolitch Romano Dascenzo Gates LLC

(57) ABSTRACT

Provided is an oil-cooled motor cooling system. The oil-cooled motor cooling system includes: a motor, an oil collection assembly, and an oil spraying pipe; wherein the oil spraying pipe is disposed over the oil collection assembly, a plurality of oil spraying holes with openings are arranged in the oil spraying pipe, and the oil spraying pipe is configured to spray cooling oil to the oil collection assembly through the plurality of oil spraying holes; and the oil collection assembly includes a first oil collection tray and a second oil collection tray, wherein the first oil collection (Continued)

tray and the second oil collection tray are respectively disposed over a first end and a second end of a stator winding, each of the first oil collection tray and the second oil collection tray is in an arc shape matching the stator winding in shape.

20 Claims, 6 Drawing Sheets

(51) Int. Cl.
  *H02K 5/20* (2006.01)
  *H02K 9/19* (2006.01)
(58) Field of Classification Search
  CPC .... H02K 7/083; H02K 9/00; H02K 9/16; H02K 9/18; H02K 9/19; H02K 9/193
  See application file for complete search history.

(56) References Cited

U.S. PATENT DOCUMENTS

| | | | | |
|---|---|---|---|---|
| 7,834,492 | B2 * | 11/2010 | Iund | H02K 9/19 310/58 |
| 7,847,444 | B2 * | 12/2010 | Kingman | H02K 5/203 310/91 |
| 8,247,934 | B2 * | 8/2012 | Matsui | H02K 9/19 310/53 |
| 8,421,284 | B2 * | 4/2013 | Sugimoto | H02K 9/19 310/58 |
| 8,552,603 | B2 * | 10/2013 | Minemura | H02K 9/19 310/59 |
| 8,686,605 | B2 | 4/2014 | Takahashi et al. | |
| 8,970,073 | B2 | 3/2015 | Miyamoto et al. | |
| 10,439,477 | B2 * | 10/2019 | Pinkley | H02K 9/00 |
| 10,840,768 | B2 * | 11/2020 | Suzuki | H02K 11/25 |
| 10,879,770 | B2 * | 12/2020 | Sakurada | H02K 7/116 |
| 10,951,093 | B2 * | 3/2021 | Yasuda | H02K 5/203 |
| 11,125,315 | B2 * | 9/2021 | Graves | H02K 7/003 |
| 11,251,682 | B2 * | 2/2022 | Lee | H02K 1/145 |
| 12,199,471 | B2 * | 1/2025 | Luo | H02K 9/00 |
| 2011/0156508 | A1 | 6/2011 | Minemura et al. | |

FOREIGN PATENT DOCUMENTS

| | | | | |
|---|---|---|---|---|
| CN | 206559197 U | * | 10/2017 | |
| CN | 207559714 U | | 6/2018 | |
| CN | 108336865 A | | 7/2018 | |
| CN | 109194035 A | | 1/2019 | |
| CN | 109936232 A | * | 6/2019 | |
| CN | 109936241 A | | 6/2019 | |
| CN | 111503252 A | | 8/2020 | |
| CN | 111564927 A | | 8/2020 | |
| CN | 211606273 U | | 9/2020 | |
| CN | 111799950 A | * | 10/2020 | ............ B60L 15/28 |
| CN | 111969791 A | | 11/2020 | |
| CN | 112701856 A | | 4/2021 | |
| CN | 112821604 A | * | 5/2021 | ............ H02K 1/20 |
| CN | 113364166 A | * | 9/2021 | ............ H02K 1/20 |
| CN | 113422475 A | * | 9/2021 | |
| CN | 215646420 U | * | 1/2022 | |
| CN | 109861418 B | * | 4/2022 | |
| EP | 3644480 A1 | | 4/2020 | |
| JP | 2004180376 A | * | 6/2004 | |
| JP | 5349281 B2 | | 11/2013 | |
| KR | 20200102253 A | * | 8/2020 | |
| KR | 20210102522 A | * | 8/2021 | |
| WO | WO-2012176052 A2 | * | 12/2012 | ............ H02K 1/32 |

OTHER PUBLICATIONS

The State Intellectual Property Office of People's Republic of China, First Office Action in Patent Application No. 202011562372.5 issued on Oct. 8, 2021, which is a foreign counterpart application corresponding to this U.S. Patent Application, to which this application claims priority.
The State Intellectual Property Office of People's Republic of China, Second Office Action in Patent Application No. 202011562372.5 issued on Jan. 19, 2022, which is a foreign counterpart application corresponding to this U.S. Patent Application, to which this application claims priority.
First Substantive Examination Report of counterpart Saudi Arabia's application No. 523441294 issued on May 26, 2024.
Extended European Search Report Communication Pursuant to Rule 62 EPC for European Application No. 21908747.5 dated May 27, 2024, which is a foreign counterpart application to this application.

* cited by examiner

OIL-COOLED MOTOR COOLING SYSTEM, AND VEHICLE

CROSS-REFERENCE TO RELATED APPLICATION

This application is a U.S. national stage of international application No. PCT/CN2021/123354, filed on Oct. 12, 2021, which claims priority to Chinese Patent Application No. 202011562372.5, filed on Dec. 25, 2020 and entitled "OIL-COOLED MOTOR COLLING SYSTEM," the disclosure of which is herein incorporated by reference in its entirety.

TECHNICAL FIELD

The present disclosure relates to the field of vehicle technologies, and in particular, relates to an oil-cooled motor cooling system and a vehicle.

BACKGROUND OF THE INVENTION

For most battery electric vehicles or hybrid electric vehicles, motors are cooled by a water cooling system.

SUMMARY OF THE INVENTION

In view of the above problems, embodiments of the present disclosure provide an oil-cooled motor cooling system and a vehicle. The technical solutions of the embodiments of the present disclosure are as follows.

Some embodiments of the present disclosure provide an oil-cooled motor cooling system. The system includes: an oil collection assembly, an oil spraying pipe, an oil guide pipe, and a motor.

The motor includes a rotor shaft, a first bearing and a second bearing supporting the rotor shaft, a stator winding, a stator core, and a rotor core.

The oil guide pipe is aligned with the rotor shaft in an axis direction of the rotor shaft, and is configured to spray cooling oil to an inner of the rotor shaft.

Two ends of a shaft body of the rotor shaft are respectively disposed with a first oil dumping hole and a second oil dumping hole, wherein the first oil dumping hole corresponds to the first bearing, and the second oil dumping hole corresponds to the second bearing.

The oil spraying pipe is disposed over the oil collection assembly, a plurality of oil spraying holes with openings facing towards the oil collection assembly are arranged in the oil spraying pipe, and the oil spraying pipe is configured to receive cooling oil provided by an oil pump and spray the cooling oil to the oil collection assembly.

The oil collection assembly includes a first oil collection tray and a second oil collection tray, wherein the first oil collection tray and the second oil collection tray are respectively disposed over two ends of the stator winding, each of the first oil collection tray and the second oil collection tray is in an arc shape matching the stator winding in shape, and a plurality of through holes are arranged in the first oil collection tray, a plurality of second through holes are arranged in the second oil collection tray, and the oil collection assembly is configured to cause the cooling oil sprayed from the oil spraying pipe to flow to the stator winding.

All the oil collection assembly, the oil spraying pipe, and the oil guide pipe are suitable for connection to a transmission housing.

In some embodiments, the first oil dumping hole and the second oil dumping hole are inclined holes whose outer ends are more proximal to an end of the rotor shaft than the inner ends.

In some embodiments, the oil spraying pipe includes a straight pipe and a bent pipe.

A first pipe opening of the straight pipe is closed, a second pipe opening of the straight pipe is opened, a plurality of oil spraying holes are arranged in the straight pipe, and the straight pipe is parallel to an axis of the motor.

One portion of the bent pipe is parallel to the straight pipe, the other portion of the bent pipe is perpendicular to the straight pipe, a plurality of oil spraying holes are arranged in the portion, parallel to the straight pipe, of the bent pipe, a first pipe opening of the bent pipe is closed, and a second pipe opening of the bent pipe is connected to a pipe body of the straight pipe.

In some embodiments, a width of the first oil collection tray and a width of the second oil collection tray are the same as widths of portions, going beyond the stator core, of the stator windings at the corresponding ends.

In some embodiments, the first oil collection tray includes a first arc tray body, two first arc side edges, and a plurality of first partition ribs, wherein the two first arc side edges are respectively disposed on two sides of the first arc tray body and protrude upwards, and the plurality of first partition ribs are evenly connected between the two first arc side edges, such that a plurality of first oil collection partitions are formed on the first arc tray body, wherein a plurality of first through holes are arranged in each of the plurality of first oil collection partitions; and the second oil collection tray includes a second arc tray body, two second arc side edges, and a plurality of second partition ribs, wherein the two second arc side edges are respectively disposed on two sides of the second arc tray body and protrude upwards, and the plurality of second partition ribs are evenly connected between the two second arc side edges, such that a plurality of second oil collection partitions are formed on the second arc tray body, wherein a plurality of second through holes are arranged in each of the plurality of second oil collection partitions.

In some embodiments, both a radian of the first oil collection tray and a radian of the second oil collection tray are 120 degrees.

In some embodiments, three through holes are arranged in each of the plurality of first oil collection partitions and the plurality of second oil collection partitions, wherein an isosceles triangle is formed by connecting centers of the three first through holes, a vertex angle of the isosceles triangle is smaller than each of base angles of the isosceles triangle, and the three through holes are disposed in a down side of the oil collection partition.

In some embodiments, both the first oil collection tray and the second oil collection tray are respectively symmetric about arc centerlines of the trays.

In some embodiments, two ends of the arc side edge, proximal to the second oil collection tray, of the first oil collection tray are respectively disposed with vertical first lugs, wherein the first lug is provided with a connection pipe; and two ends of the arc side edge, proximal to the first oil collection tray, of the second oil collection tray are respectively disposed with vertical second lugs, wherein the second lug is opposite to the first lug, and is integrated with a connection pillar, wherein the connection pillar is inserted into the connection pipe.

In some embodiments, two ends of the arc side edge, distal from the second oil collection tray, of the first oil collection tray are respectively disposed with plug-in pillars, wherein the plug-in pillar is suitable for interference fitting with a hole in a transmission housing; and a center of the arc side edge, distal from the first oil collection tray, of the second oil collection tray protrudes upwards to form a positioning portion, wherein an end face of the positioning portion is in a wavy shape, and the positioning portion is suitable for contact with an inner wall of the transmission housing.

Some embodiments of the present disclosure provide another oil-cooled motor cooling system. The system includes: a motor, an oil collection assembly, and an oil spraying pipe.

The oil spraying pipe is disposed over the oil collection assembly, a plurality of oil spraying holes with openings facing towards the oil collection assembly are arranged in the oil spraying pipe, and the oil spraying pipe is configured to spray cooling oil to the oil collection assembly through the plurality of oil spraying holes.

The oil collection assembly includes a first oil collection tray and a second oil collection tray, wherein the first oil collection tray and the second oil collection tray are respectively disposed over a first end and a second end of a stator winding of the motor, each of the first oil collection tray and the second oil collection tray is an arc matching the stator winding in shape, a plurality of first through holes are arranged in the first oil collection tray, a plurality of second through holes are arranged in the second oil collection tray, and the oil collection assembly is configured to cause the cooling oil sprayed from the oil spraying pipe to flow to the stator winding through the plurality of first through holes and the plurality of second through holes.

In some embodiments, the oil spraying pipe includes a straight pipe and a bent pipe.

A first end of the straight pipe is closed, a second end of the straight pipe is opened, a plurality of oil spraying holes are arranged in the straight pipe, and the straight pipe is parallel to an axis of the motor.

The bent pipe includes a first pipe and a second pipe that are connected, wherein the first pipe is parallel to the straight pipe, an end, distal form the first pipe, of the second pipe is connected to the straight pipe, a plurality of oil spraying holes are arranged in the first pipe, and an end, distal form the second pipe, of the first pipe is closed.

In some embodiments, the oil spraying pipe is made of a stainless steel.

In some embodiments, a width of the first oil collection tray matches a width of a portion, going beyond a stator core, of the first end of the stator winding, and a width of the second oil collection tray matches a width of a portion, going beyond the stator core, of the second end of the stator winding.

In some embodiments, the first oil collection tray includes a first arc tray body, two first arc side edges, and a plurality of first partition ribs, wherein the two first arc side edges are respectively disposed on two sides of the first arc tray body and protrude in a direction away from the stator winding, and the plurality of first partition ribs are evenly connected between the two first arc side edges, such that a plurality of first oil collection partitions are formed on the first arc tray body, wherein a plurality of first through holes are arranged in each of the plurality of first oil collection partitions; and the second oil collection tray includes a second arc tray body, two second arc side edges, and a plurality of second partition ribs, wherein the two second arc side edges are respectively disposed on two sides of the second arc tray body and protrude in a direction away from the stator winding, and the plurality of second partition ribs are evenly connected between the two second arc side edges, such that a plurality of second oil collection partitions are formed on the second arc tray body, wherein a plurality of second through holes are arranged in each of the plurality of second oil collection partitions.

In some embodiments, both a radian of the first oil collection tray and a radian of the second oil collection tray are 120 degrees.

In some embodiments, three first through holes are arranged in each of the plurality of first oil collection partitions, wherein an isosceles triangle is formed by connecting centers of the three first through holes, and two of the three first through holes are close to lower edges of the oil collection partitions thereof; and three second through holes are arranged in each of the plurality of second oil collection partitions, wherein an isosceles triangle is formed by connecting centers of the three second through holes, and two of the three second through holes are close to lower edges of the oil collection partitions thereof.

In some embodiments, both the first oil collection tray and the second oil collection tray are respectively symmetric about arc centerlines of the trays.

In some embodiments, two ends of the arc side edge, proximal to the second oil collection tray, of the first oil collection tray are respectively disposed with vertical first lugs, wherein the first lug is provided with a connection pipe; and two ends of the arc side edge, proximal to the first oil collection tray, of the second oil collection tray are respectively disposed with vertical second lugs, wherein the second lug is opposite to the first lug, and is provided with a connection pillar, wherein the connection pillar is inserted into the connection pipe.

In some embodiments, the oil-cooled motor cooling system further includes a transmission housing;

two ends of the arc side edge, distal from the second oil collection tray, of the first oil collection tray are respectively disposed with plug-in pillars, wherein the plug-in pillar is suitable for interference fitting with a hole in the transmission housing; and a positioning portion is formed on a center of the arc side edge, distal from the first oil collection tray, of the second oil collection tray, wherein the positioning portion protrudes in a wavy shape in the direction away from the stator winding, and is suitable for contact with an inner wall of the transmission housing.

In some embodiments, both the first oil collection tray and the second oil collection tray are injection molded parts made of high temperature resistant materials.

In some embodiments, the oil-cooled motor cooling system further includes an oil guide pipe.

The oil guide pipe is conducted to an inner of a rotor shaft of the motor, and is configured to inject the cooling oil to the inner of the rotor shaft.

Two ends of a shaft body of the rotor shaft of the motor are respectively disposed with a first oil dumping hole and a second oil dumping hole, wherein the first oil dumping hole is configured to dump cooling oil inside the rotor shaft to a first bearing supporting the rotor shaft, and the second oil dumping hole is configured to dump the cooling oil inside the rotor shaft to a second bearing supporting the rotor shaft, wherein the first bearing and the second bearing are respectively proximal to two ends of the rotor shaft.

In some embodiments, an axis of the first oil dumping hole is aligned with the first bearing, and axis of the second oil dumping hole is aligned with the second bearing.

In some embodiments, a plurality of first oil dumping holes and a plurality of second oil dumping holes are defined, and the plurality of first oil dumping holes and the plurality of second oil dumping holes are respectively disposed around the shaft body of the rotor shaft.

Some embodiments of the present disclosure further provide a vehicle including the above oil-cooled motor cooling system.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION OF THE INVENTION

To make the objectives, technical solutions, and advantages of the present disclosure clearer, the embodiments of the present disclosure are further described in detail hereinafter with reference to the accompanying drawings. Apparently, the described embodiments are merely some embodiments of the present disclosure but not all embodiments. On the basis of the embodiments of the present disclosure, other embodiments acquired by persons of ordinary skill in the art without creative efforts should be included in the scope of the protection of the present disclosure.

For functioning of the water cooling system, a water jacket is disposed inside the motor, such that a coolant is circulated in the water jacket to cool the motor. However, the water cooling system only cools an iron core, such that the motor has a poor heat dissipation effect and thus has a low efficiency.

Figure 1:
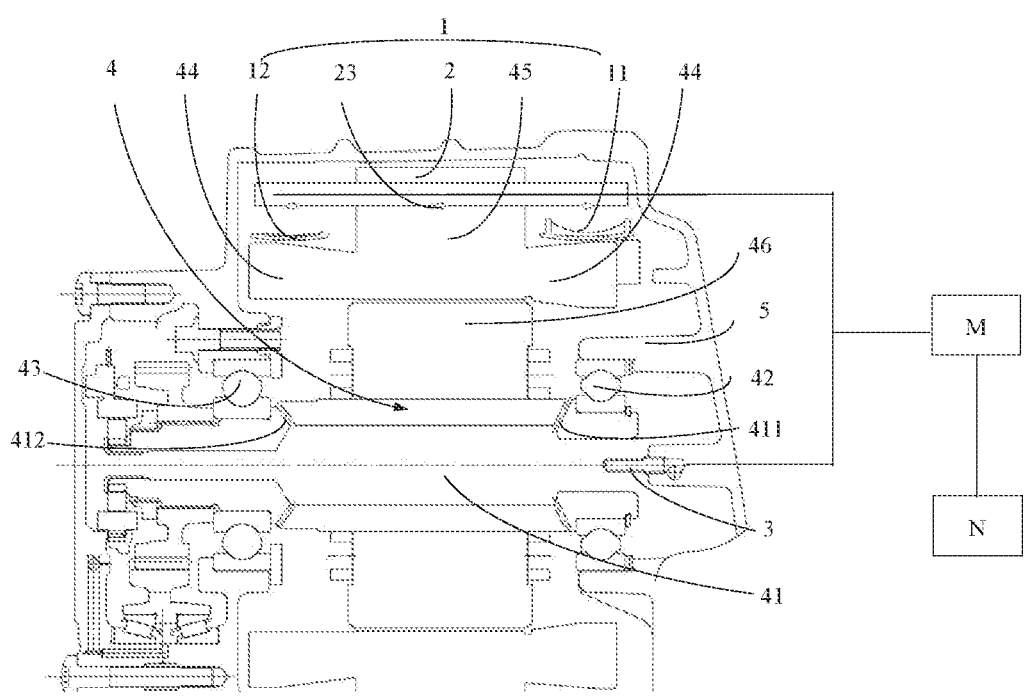
FIG. 1 is a main cross-sectional view of an oil-cooled motor cooling system according to some embodiments of the present disclosure.

The embodiments of the present disclosure provide an oil-cooled motor cooling system. As shown in FIG. 1, the system includes an oil collection assembly 1, an oil spraying pipe 2, and a motor 4.

The motor 4 includes a rotor shaft 41, a first bearing 42 and a second bearing 43 that support the rotor shaft 41, a stator winding 44, a stator core 45, and a rotor core 46. The oil spraying pipe 2 is disposed over the oil collection assembly 1. For example, the oil spraying pipe 2 is disposed directly over the oil collection assembly 1, that is, a center of the oil spraying pipe 2 is directly over a center of the oil collection assembly 1 in a vertical direction. A plurality of oil spraying holes 23 with openings facing towards the oil collection assembly 1 are arranged in the oil spraying pipe 2. The oil spraying pipe 2 is configured to spray cooling oil to the oil collection assembly 1 through the plurality of oil spraying holes 23. For example, the oil spraying pipe 2 is connected to an oil pump M to receive the cooling oil from the oil pump M.

Figure 3:
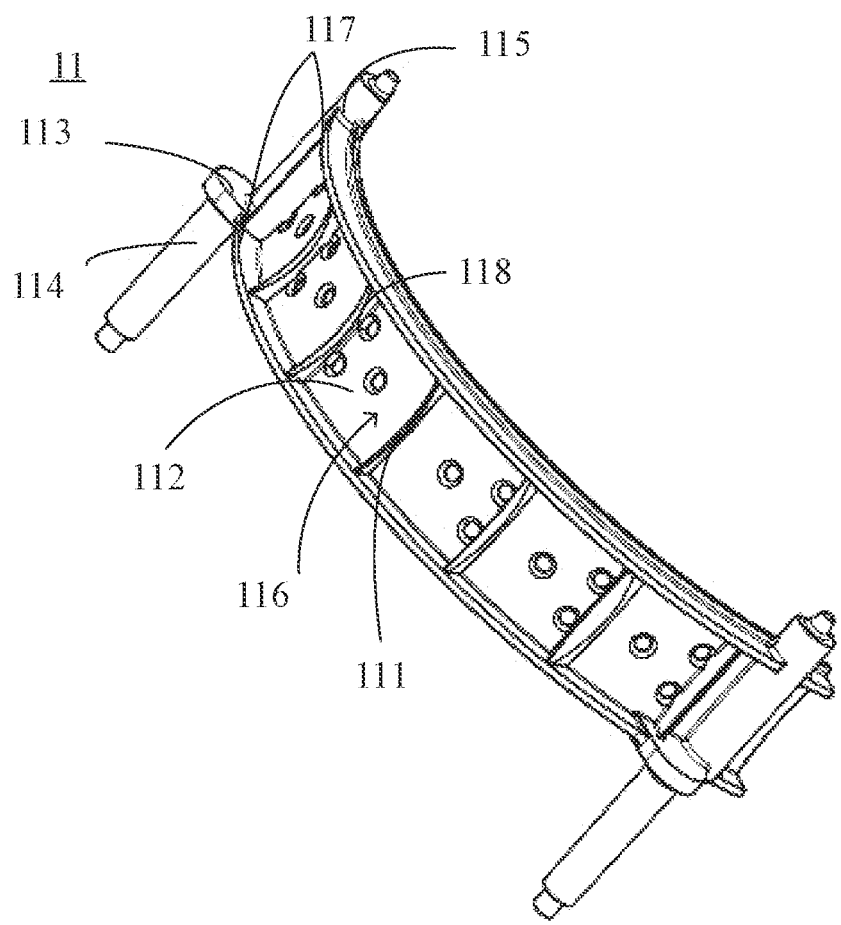
FIG. 3 is a schematic structural diagram of a second oil collection tray according to some embodiments of the present disclosure.
Figure 4:
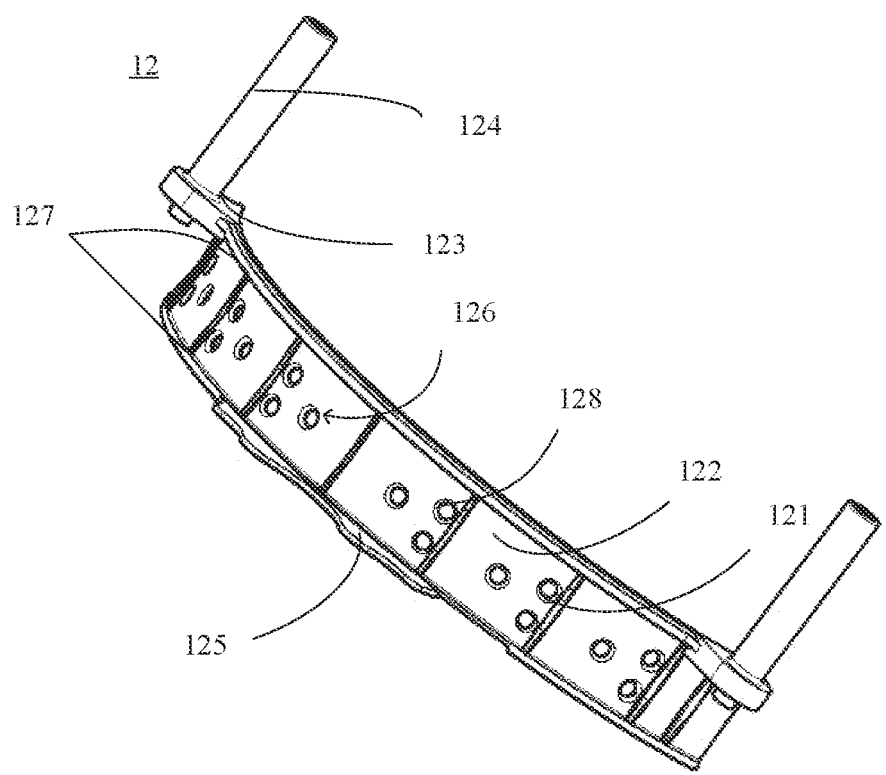
FIG. 4 is a schematic structural diagram of an oil spraying pipe according to some embodiments of the present disclosure.

As shown in FIG. 1, FIG. 3, and FIG. 4, the oil collection assembly 1 includes a first oil collection tray 11 and a second oil collection tray 12. The first oil collection tray 11 and the second oil collection tray 12 are respectively disposed over two ends of the stator winding 44, that is, the first oil collection tray 11 and the second oil collection tray 12 are respectively disposed over a first end and a second end of the stator winding 44. In addition, each of the first oil collection tray 11 and the second oil collection tray 12 is in an arc shape matching the stator winding 44 in shape, and a plurality of through holes are arranged in each of the first oil collection tray 11 and the second oil collection tray 12. That is, a plurality of first through holes 118 are arranged in the first oil collection tray 11, and a plurality of second through holes 128 are arranged in the second oil collection tray 12, such that the oil collection assembly 1 causes the cooling oil sprayed from the oil spraying pipe 2 to flow to the stator winding 44 through the plurality of first through holes 118 and the plurality of second through holes 128 to cool the stator winding 44. The oil collection assembly 1 buffers high-pressure cooling oil sprayed from the oil spraying pipe 2 to prevent an insulation layer on copper wires from being damaged due to direct spray of the cooling oil to the stator winding 44. In addition, each of the first oil collection tray 11 and the second oil collection tray 12 is in an arc matching the stator winding 44 in shape, such that the cooling oil is guarded, and the stator winding 44 is greatly cooled. For example, an outline of an edge, proximal to the first oil collection tray 11, of the stator winding 44 is in a first arc, and accordingly, an outline of an edge, proximal to the stator winding 44, of the second oil collection tray 12 is in a second arc. The first arc and the second arc are substantially concentric. Upon flow of the cooling oil at a flow rate to the oil spraying pipe 2, the cooling oil is sprayed to tray bodies of the first oil collection tray 11 and the second oil collection tray 12 through the oil spraying holes 23 in the oil spraying pipe 2. The cooling oil on the two oil collection trays is respectively drizzled to corresponding ends of the lower stator winding 44 through the through holes in the tray bodies, such that the two ends of the stator winding 44 are cooled. In addition, in the case that the cooling oil on the two oil collection trays reaches a maximum oil storage limit, the cooling oil is spilt from the oil collection tray, such that an end face of the stator winding 44 is cooled. The cooling oil flowed to the oil spraying pipe 2 can also be sprayed to the stator core 45 through the oil spraying holes 23, such that the stator core 45 is cooled.

It should be noted that two ends, that is, a first end and a second end, of the stator winding 44 indicate two portions, not coved by the stator core 45, of the stator winding 44. The two portions are exposed from two ends in an axis direction of the stator core 45. It should be understood that in the case that the motor is operated, the heat generated by the stator winding 44 is huge, a temperature is high, and thus the first oil collection tray 11 and the second oil collection tray 12 are prevented from contact the stator winding 44.

Both the oil collection assembly 1 and the oil spraying pipe 2 are suitable for connection to a transmission housing 5, and the oil collection assembly 1 and the oil spraying pipe 2 are secured at a predetermined position by the transmission housing 5 to achieve their functions.

It should be noted that the transmission housing 5 includes an oil passage, such that the cooling oil provided by the oil pump M is transmitted to an oil guide pipe 3 and the oil spraying pipe 2 through corresponding oil passages. The detailed structure of the oil passage on the transmission housing 5 is not limited in the embodiments of the present disclosure.

In the oil-cooled motor cooling system in the embodiments of the present disclosure, the oil spraying pipe is disposed over the oil collection assembly, and two oil collection trays are respectively disposed over two ends of the stator winding, such that the cooling oil in the oil spraying pipe can be sprayed to two oil collection trays through the oil spraying holes, and the cooling oil on the two oil collection trays is drizzled to two ends of the stator winding through the through holes. Thus, the stator winding with huge generated heat is cooled, the cooling effect is improved, and the operation efficiency of the motor is enhanced.

For an improved cooling effect for two ends of the stator winding, structures of the oil spraying pipe 2, the first oil collection tray 11, and the second oil collection tray 12 are set as follows in the embodiments of the present disclosure.

Figure 2:
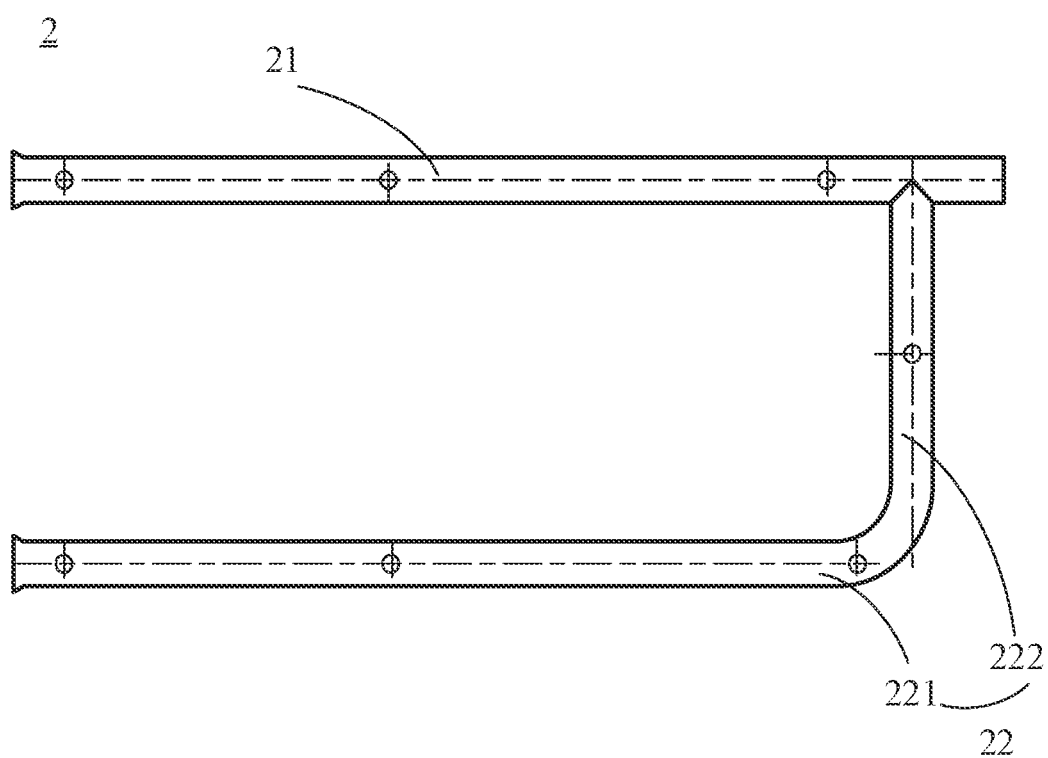
FIG. 2 is a schematic structural diagram of a first oil collection tray according to some embodiments of the present disclosure.

For the oil spraying pipe:

As shown in FIG. 2, the oil spraying pipe 2 includes a straight pipe 21 and a bent pipe 22.

A first end of the straight pipe 21 is closed, a second end of the straight pipe 21 is opened, and a plurality of oil spraying holes 23 are arranged in the straight pipe 21. The opened end is used to receive the cooling oil, and the closed end is used to block flow of the cooling oil, such that the cooling oil is only sprayed towards the oil collection assembly 1 through the oil spraying holes 23. The straight pipe 21 is parallel to an axis of the motor 4. The opened end is connected to the oil pump M to receive the cooling oil from the oil pump M.

The bent pipe 22 includes a first pipe 221 and a second pipe 222 that are connected. The first pipe 221 is parallel to the straight pipe 21, and an end, distal form the first pipe 221, of the second pipe 222 is connected to the straight pipe 21. For example, the second pipe 222 is perpendicular to the straight pipe 21, such that the cooling oil in the straight pipe 21 is transmitted to the first pipe 221 through the second pipe 222. A plurality of oil spraying holes 23 are arranged in the first pipe 221, and an end, distal form the second pipe 222, of the first pipe 221 is closed. The closed end is used to block flow of the cooling oil, such that the cooling oil is sprayed towards the oil collection assembly 1 only through the oil spraying holes 23.

The straight pipe 21 and the first pipe 221 of the bent pipe 22 span the first oil collection tray 11, the stator core 45, and the second oil collection tray 12. For example, an extension direction of the straight pipe 21 and an extension direction of the first pipe 221 of the bent pipe 22 are substantially parallel to the axis direction of the stator core 45, and two ends of the straight pipe 21 and two ends of the first pipe 221 of the bent pipe 22 respectively extend over the first oil collection tray 11 and the second oil collection tray 12, such that the cooling oil in the oil spraying pipe 2 is sprayed to the first oil collection tray 11, the stator core 45, and the second oil collection tray 12 through the oil spraying holes 23.

It should be noted that the straight pipe 21 and the first pipe 221 of the bent pipe 22 are respectively used to spray the coolant to two semi-arc tray bodies of the first oil collection tray 11 and the second oil collection tray 12. That is, the straight pipe 21 is used to spray the coolant to a portion of the first oil collection tray 11 and a portion of the second oil collection tray 12, the first pipe 221 of the bent pipe 22 is used to spray the coolant to another portion of the first oil collection tray 11 and another portion of the second oil collection tray 12, an area of a region corresponding to the spray of the coolant by the straight pipe 21 is substantially equal to an area of a region corresponding to the spray of the coolant by the first pipe 221 of the bent pipe 22. The second pipe 222 of the bent pipe 22 functions as connection of the straight pipe 21 to the bent pipe 22. The oil spraying hole 23 are arranged in the second pipe 222 to cool the stator winding 44.

For uniform cooling of the stator winding 44, amounts of the cooling oil passing the two semi-arc tray bodies of the first oil collection tray 11 and the second oil collection tray 12 are the same. That is, the cooling oil on the first oil collection tray 11 and the cooling oil on the second oil collection tray 12 are uniform. Thus, in the embodiments of the present disclosure, a center line of the oil spraying pipe 2 and arc centerlines of the first oil collection tray 11 and the second oil collection tray 12 are collinear, that is, the straight pipe 21 and the first pipe 221 of the bent pipe 22 are symmetric about arc centerlines of the two oil collection trays.

For the cooling effect of the stator core 45, a reasonable distance between the straight pipe 21 and the first pipe 221 of the bent pipe 22 is set. The straight pipe 21 and the first pipe 221 of the bent pipe 22 are connected by the second pipe 222 of the bent pipe 22, and thus a reasonable length of the second pipe 222 of the bent pipe 22 is set. In the case that the distance between the straight pipe 21 and the first pipe 221 of the bent pipe 22 is less, the cooling oil sprayed by a center portion of the oil spraying pipe 2 is concentrated on a center portion of the stator core 45, such that the cooling effect for other portions of the stator core 45 is poor. In the case that the distance between the straight pipe 21 and the first pipe 221 of the bent pipe 22 is great, the cooling oil sprayed by the center portion of the oil spraying pipe 2 is concentrated on two sides of the stator core 45, such that the cooling effect for the center portion of the stator core 45 is poor.

For example, lengths of the straight pipe 21 and the first pipe 221 of the bent pipe 22 correspond to, for example, are substantially the same as or greater than a distance between the first oil collection tray 11 and the second oil collection tray 12. The distance between the first oil collection tray 11 and the second oil collection tray 12 is determined based on the specific structure of the motor 4, and thus the lengths of the straight pipe 21 and the first pipe 221 of the bent pipe 22 are determined based on the specific structure of the motor 4.

In the embodiments of the present disclosure, upon multiple simulation experiments, an effect of spraying oil by the oil spraying pipe 2 is improved in the case that three oil spraying holes 23 are arranged in the straight pipe 21, three oil spraying holes 23 are arranged in the first pipe 221 of the bent pipe 22, and three oil spraying holes 23 are arranged in the second pipe 222 of the bent pipe 22, which meet use requirements.

It should be understood that distances between the three oil spraying holes 23 in the straight pipe 21 or the first pipe 221 of the bent pipe 22 are reasonably set, such that the cooling oil in the oil spraying pipe 2 can be evenly sprayed to the two oil collection trays.

In some embodiments, for securing of the oil spraying pipe 2 to the transmission housing 5, the straight pipe 21 continuously extends at a connection position of the bent pipe 22 in the embodiments of the present disclosure, and the extension portion is suitable for interference fitting with corresponding hole in the transmission housing 5. It should be noted that the above extension portion on the straight pipe 21 is merely used to secure the oil spraying pipe to the transmission housing 5, and thus it is not necessary to dispose the oil spraying hole 23 therein.

As an oil pressure of the cooling oil transmitted by the oil pump M is great, the oil spraying pipe 2 is made of a stainless steel in the embodiments of the present disclosure and thus has a sufficient strength. In addition, the oil spraying pipe made of the stainless steel is not prone to rust.

For the first oil collection tray 11 and the second oil collection tray 12:

For better cooling for two ends and two end faces of the stator winding 44, a width of the first oil collection tray 11 matches a width of a portion, going beyond a stator core 45, of the first end of the stator winding 44. For example, the width of the first oil collection tray is the same as the width of the portion, going beyond the stator core, of the first end of the stator winding. Alternatively, a difference between the width of the first oil collection tray and the width of the portion, going beyond the stator core, of the first end of the stator winding is less, that is, the width of the first oil collection tray 11 is slightly greater than or less than the width of the portion, going beyond the stator core 45, of the first end of the stator winding 44, such that the first oil collection tray 11 just covers over the portion, going beyond the stator core 45, of the first end of the stator winding 44. As such, the cooling effect for the two ends of the stator winding 44 due to less width does not occur, and overflow and downward flow of the cooling oil for cooling of the end face of the stator winding 44 due to great width do not occur.

As shown in FIG. 3, the first oil collection tray 11 includes a first arc tray body 116, two first arc side edges 117, and a plurality of first partition ribs 111. The two first arc side edges 117 are respectively disposed on two sides of the first arc tray body 116 and protrude in a direction away from the stator winding 44, and the plurality of first partition ribs 111 are evenly connected between the two first arc side edges 117, such that a plurality of first oil collection partitions 112 (or oil collection grids) are formed on the first arc tray body 116. A plurality of first through holes 118 are arranged in each of the plurality of first oil collection partitions 112. That is, the first oil collection tray 11 is equivalent to a shallow slot, and the shallow slot is divided into a plurality of small square partitions or rectangular partitions. Due to the plurality of first oil collection partitions 112, the cooling oil sprayed from the oil spraying pipe 2 to the first oil collection tray 11 is temporarily stored to form an oil face with a height, which facilitates the cooling oil drizzling on the lower stator winding 44 through the first through holes 118 in the first oil collection tray 11. On the contrary, where the first oil collection partition 112 is not provided, the cooling oil sprayed to the first oil collection tray 11 would flow along a surface of the tray body, such that less cooling oil can drizzle on the lower stator winding 44 through the first through holes 118, and the cooling effect is poor.

It should be noted that the above first partition rib 111 functions as partition of the first arc tray body 116 to a plurality of first oil collection partitions 112 and reinforcement of two first arc side edges 117.

It should be understood that a height of the first partition rib 111 is properly defined. In the case that the height is less, the oil face with the height is not formed, which does not facilitate downward drizzling of the cooling oil sprayed to the first oil collection tray 11 through the first through holes 118. In the case that the height is great, the cooling oil in the first oil collection tray 11 is not prone to overflowing, such that the cooling effect for the end face of the lower stator winding 44 is poor.

For sufficient drainage of the cooling oil, in the embodiments of the present disclosure, a radian of the first oil collection tray 11 is 120 degrees, that is, the first oil collection tray 11 covers one-third of a circumference of the stator winding 44 at the corresponding end. Based on the drainage function of the first oil collection tray 11 with the arc, the cooling oil can sufficiently cool the stator winding 44.

For the effect of drizzling oil of the first oil collection tray 11, as shown in FIG. 3, three first through holes 118 are arranged in each of the first oil collection partitions 112, an isosceles triangle is formed by connecting centers of the three first through holes 118, and two of the three first through holes 118 are close to lower edges of the oil collection partitions thereof. In some embodiments, the three first through holes 118 are disposed in a lower half portion of the oil collection partition. A distance between the upper first through hole 118 and the lower first through hole 118 is greater than a distance between the two lower first through holes 118. The positions of the three first through holes 118 match a flowing trend of the coolant, and thus more cooling oil passes through the first through hole 118. Thus, a greater effect of drizzling oil is achieved based on the above structure, such that the stator winding 44 is greatly cooled.

For uniform cooling of the stator winding 44, as shown in FIG. 3, the first oil collection tray 11 is symmetric about the arc centerline of the tray. That is, numbers of the first oil collection partitions 112 on two sides of the arc centerline of the first oil collection tray 11 are equal, and two first through holes 118 in two first oil collection partitions 112 on the corresponding positions are also symmetric about the arc centerline.

In some embodiments, as shown in FIG. 3, six first oil collection partitions 112 are formed on the first oil collection tray 11, that is, three first oil collection partitions 112 are disposed on both sides of the arc centerline of the tray body of the first oil collection tray 11, such that the storage and flowing of the cooling oil on each semi-arc tray body are facilitated.

Similarly, the second oil collection tray 12 has the similar structure as the first oil collection tray 11. Thus, the structure of the second oil collection tray 12 is simply described, and technical effects and functions of the structural features can be referred to the corresponding features of the first oil collection tray 11, and are not repeated.

For great cooling for two ends and two end faces of the stator winding 44, a width of the second oil collection tray 12 matches a width of a portion, going beyond the stator core 45, of the second end of the stator winding 44. For example, the width of the second oil collection tray is the same as the width of the portion, going beyond the stator core, of the second end of the stator winding. Alternatively, a difference between the width of the second oil collection tray and the width of the portion, going beyond the stator core, of the second end of the stator winding is less, that is, the width of the second oil collection tray 12 is slightly greater than or less than the width of the portion, going beyond the stator core 45, of the second end of the stator winding 44.

As shown in FIG. 4, the second oil collection tray 12 includes a second arc tray body 126, two second arc side edges 127, and a plurality of second partition ribs 121. The two second arc side edges 127 are respectively disposed on two sides of the second arc tray body 126 and protrude in the direction away from the stator winding 44, and the plurality of second partition ribs 121 are evenly connected between the two second arc side edges 127, such that a plurality of second oil collection partitions 122 are formed on the second arc tray body 126.

For sufficient drainage of the cooling oil, a radian of the second oil collection tray 12 is 120 degrees.

For the drizzling oil effect of the second oil collection tray 12, as shown in FIG. 4, three second through holes 128 are arranged in each of the second oil collection partitions 122, an isosceles triangle is formed by connecting centers of the three second through holes 128, and two of the three second through holes 128 are close to lower edges of the oil collection partitions thereof.

For uniform cooling of the stator winding 44, as shown in FIG. 4, the second oil collection tray 12 is symmetric about the arc centerlines of the trays.

In some embodiments, as shown in FIG. 4, six second oil collection partitions 122 are formed on the second arc tray body 126. That is, three second oil collection partitions 122 are disposed on both sides of the arc centerline of the tray body of the second oil collection tray 12.

It should be noted that widths of portions, going beyond the stator core 45, of two ends of the stator winding 44 may be different based on different function requirements. Thus, the width of the first oil collection tray 11 and the width of the second oil collection tray 12 are not necessarily equal. For other features, for example, the number of the oil collection partitions, the number and position of the through holes in each of the oil collection partitions, the radian of the tray body of the oil collection tray, and the like are equal, such that the cooling oil is drizzled to the stator winding 44 through different passages of the oil spraying pipe, and the stator winding 44 is evenly cooled.

The distances between the first oil collection tray 11 and the second oil collection tray 12, and the stator winding 44 affect the cooling effect. In the case that the distance is great, a flowing passage of the cooling oil is overlong, differences in durations in cooling the portions of the stator winding 44 are great, and thus the cooling for the stator winding 44 is not uniform. In the case that the distance is less, an impact force of the cooling oil sprayed from the oil spraying hole 23 is great, and thus the insulation layer on a surface of the copper wires of the stator winding 44 is damaged. Upon comparative experiments, in the embodiments of the present disclosure, the distances between the first oil collection tray 11 and the second oil collection tray 12, and the corresponding stator winding 44 are 1.6 mm, such that the above problem is greatly avoided.

For securing of the first oil collection tray 11 and the second oil collection tray 12, the first oil collection tray 11 and the second oil collection tray 12 are secured to form an integral body, and then the integral body formed by the first oil collection tray 11 and the second oil collection tray 12 is secured. As shown in FIG. 3, in the embodiments of the present disclosure, two ends of the arc side edge, proximal to the second oil collection tray 12, of the first oil collection tray 11 are respectively disposed with vertical first lugs 113, and the first lug 113 is provided with a connection pipe 114. As shown in FIG. 4, two ends of the arc side edge, proximal to the first oil collection tray 11, of the second oil collection tray 12 are respectively disposed with vertical second lugs 123, the second lug 123 is opposite to the first lug 113, and is provided with a connection pillar 124. The connection pillar 124 is inserted into the connection pipe 114. In use, it is convenient to insert the connection pillar 124 into the connection pipe 114. It should be understood that in the case that the connection pillar 124 and the connection pipe 114 are fitted, the distance between the first oil collection tray 11 and the second oil collection tray 12 is equal to the predetermined distance.

For securing of the integral body formed by inserting the connection pillar 124 into the connection pipe 114 at a predetermined position, as shown in FIG. 3, in the embodiments of the present disclosure, two ends of the arc side edge, distal from the second oil collection tray 12, of the first oil collection tray 11 are respectively disposed with plug-in pillars 115, and the plug-in pillars 115 are suitable for interference fitting with holes in a transmission housing 5. As shown in FIG. 4, a positioning portion 125 is formed on a center of the arc side edge, distal from the first oil collection tray 11, of the second oil collection tray 12. The positioning portion 125 protrudes in a wavy shape in the direction away from the stator winding 44, and is suitable for contact with an inner wall of the transmission housing 5. An end face of the positioning portion 125 is in a wavy shape, such that the cooling oil on the second oil collection tray 12 is prevented from overflowing, and the end face of the stator winding 44 is cooled.

That is, the plug-in pillar 115 on the first oil collection tray 11 is securely connected to the transmission housing 5, and the positioning portion 125 on the second oil collection tray 12 is contacted with the inner wall of the transmission housing 5, such that the oil collection assembly 1 is secured at the predetermined position.

It should be noted that in the embodiments of the present disclosure, the oil-cooled motor cooling system is disposed inside the transmission housing 5, such that the first oil collection tray 11 and the second oil collection tray 12 are secured to the transmission housing 5.

As the flow rate and pressure of the cooling oil spray from the oil spraying pipe 2 are reduced, and requirements on strengths of the first oil collection tray 11 and the second oil collection tray 12 are lower than requirements on a strength of the oil spraying pipe 2, in the embodiments of the present disclosure, both the first oil collection tray 11 and the second oil collection tray 12 are injection molded parts and can be formed by injection molding process, such that a weight of the tray body is reduced. As the stator winding 44 below the first oil collection tray 11 and the second oil collection tray 12 generates a large amount of heat in operation, the first oil collection tray 11 and the second oil collection tray 12 are made of high temperature resistant materials.

For great cooling for the motor, as shown in FIG. 1, the oil-cooled motor cooling system in the present disclosure further includes an oil guide pipe 3. The oil guide pipe 3 is conducted to an inner of a rotor shaft 41 of the motor 4, and is configured to inject the cooling oil to the inner of the rotor shaft 41. For example, the oil guide pipe 3 is connected to the oil pump M, is aligned with the rotor shaft 41 in an axis direction of the rotor shaft 41, and injects the cooling oil provided by the oil pump M to the inner of the rotor shaft 41.

Two ends of a shaft body of the rotor shaft 41 are respectively disposed with a first oil dumping hole 411 and a second oil dumping hole 412. The first oil dumping hole 411 corresponds to a first bearing 42 supporting the rotor shaft 41, and the second oil dumping hole 412 corresponds to a second bearing 43 supporting the rotor shaft 41. The first bearing 42 and the second bearing 43 are respectively proximal to two ends of the rotor shaft 41. That is, the first bearing 42 is proximal to a first end of the rotor shaft 41, and the second bearing 43 is proximal to a second end of the rotor shaft 41. As such, the first oil dumping hole 411 dumps the cooling oil inside the rotor shaft 41 to the inner side of the first bearing 42, and the second oil dumping hole 412 dumps the cooling oil inside the rotor shaft 41 to the inner side of the second bearing 43.

It should be noted that the inner side of the first bearing 42 indicates a side, proximal to the rotor shaft 41, of the first bearing 42, and the second bearing 43 indicates a side, proximal to the rotor shaft 41, of the second bearing 43.

In the case that the rotor shaft 41 rotates, the cooling oil at a flow rate injected by the oil guide pipe 3 is dumped in all directions, and the dumped cooling oil is drizzled to the inner sides of the first bearing 42 and the second bearing 43 through the first oil dumping hole 411 and the second oil dumping hole 412, such that the first bearing 42 and the second bearing 43 are cooled. In addition, the cooling oil is rebounded to the inner side of the stator winding 44 and two sides of the rotor core 46 by the first bearing 42 and the second bearing 43, such that the inner side of the stator winding 44 and two sides of the rotor core 46 are cooled.

For facilitation of dumping of the cooling oil inside the rotor shaft 41 from the oil dumping hole, as shown in FIG. 1, in the embodiments of the present disclosure, the first oil dumping hole 411 and the second oil dumping hole 412 are inclined holes whose outer ends are more proximal to an end of the rotor shaft 41 than the inner ends. That is, an axis of the first oil dumping hole 411 and an axis of the second oil dumping hole 412 are respectively aligned with the first bearing 42 and the second bearing 43.

Figure 6:
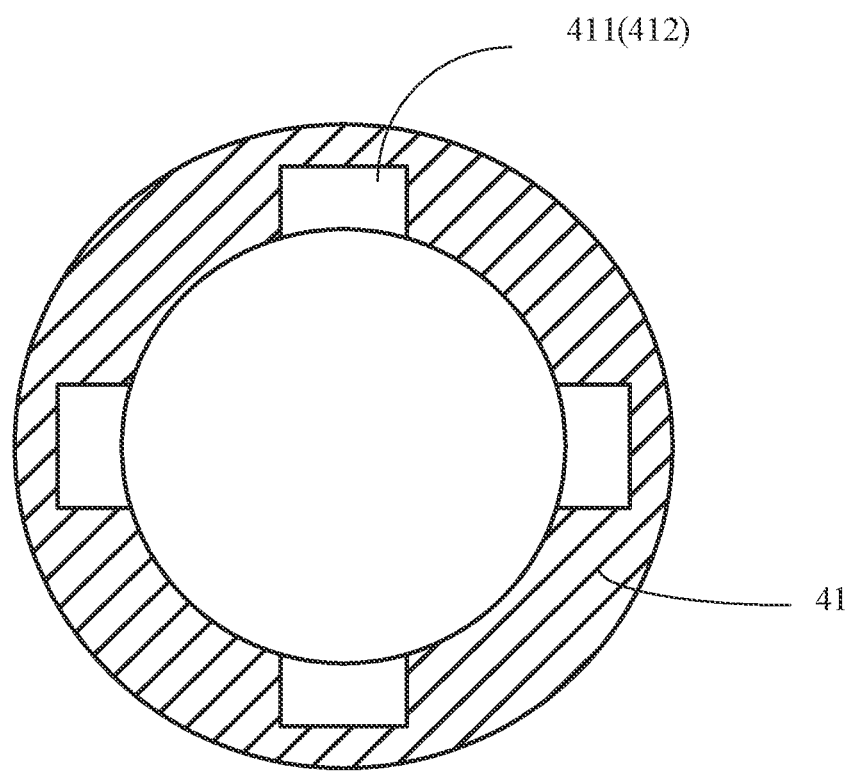
FIG. 6 is a cross-sectional view of a rotor shaft that a plurality of oil dumping holes around a shaft body are arranged in two ends of the shaft body of the rotor shaft according to some embodiments of the present disclosure.

For a great effect of dumping oil, as shown in FIG. 1 and FIG. 6, the plurality of first oil dumping holes 411 and the plurality of second oil dumping holes 412 around the shaft body of the rotor shaft 41 are disposed on two ends of the rotor shaft 41, and the axis of the first oil dumping hole 411 and the axis of the second oil dumping hole 412 are respectively aligned with a center position of the first bearing 42 and a center position of the second bearing 43. The above setting facilitates outward dumping of the cooling oil and accurate guide of the cooling oil to the first bearing 42 and the second bearing 43 that are on two sides of the rotor shaft, such that the participated cooling effect is achieved.

In some embodiments, three first oil dumping holes 411 and three second oil dumping holes 412 are defined, and sufficient cooling oil is sprayed near the first bearing 42 and the second bearing 43 by disposing such three oil dumping holes in the two ends of the shaft body of the rotor shaft 41.

In the embodiments of the present disclosure, the oil guide pipe 3 is connected to the transmission housing 5, and the oil guide pipe 3 is secured at a predetermined position by the transmission housing 5.

It should be noted that the transmission housing 5 includes an oil passage, such that the cooling oil provided by the oil pump M is transmitted to an oil guide pipe 3 through corresponding oil passages. The detailed structure of the oil passage on the transmission housing 5 is not limited in the embodiments of the present disclosure.

The oil-cooled motor cooling system in the embodiments of the present disclosure includes an oil collection assembly, an oil spraying pipe, an oil guide pipe, and a motor. A plurality of first oil dumping holes and a plurality of second oil dumping holes are defined in the rotor shaft of the motor, and the oil guide pipe is used to inject the cooling oil into the rotor shaft. As such, in the case that the rotor rotates, the cooling oil is sprayed to inner sides of bearings on two sides of the rotor shaft and then rebounded to an inner side of the stator winding and the rotor core, such that the inner side of the stator winding, the rotor core, and the bearing are cooled. A plurality of oil spraying holes are arranged in the oil spraying pipe, such that cooling oil in the oil spraying pipe can be sprayed to the oil collection assembly. The oil collection assembly includes a first oil collection tray and a second oil collection tray that are in an arc shape and are arranged with a plurality of through holes, and the cooling oil in the oil collection tray is drizzled to the stator winding and the stator core through the through holes, such that the stator winding and the stator core are cooled. By adopting the simple oil collection assembly, the oil spraying pipe and the oil guide pipe, the cooling system in the embodiments of the present disclosure achieves directly cooling of the inner side and outer side of the stator winding, the stator core, the rotor core, two sides of the rotor shaft, and the inner side of the bearing, the cooling range is increased, and the cooling effect is improved.

The operation principle of the oil-cooled motor cooling system in the embodiments of the present disclosure is described hereinafter in detail in conjunction with FIG. 5.

Figure 5:
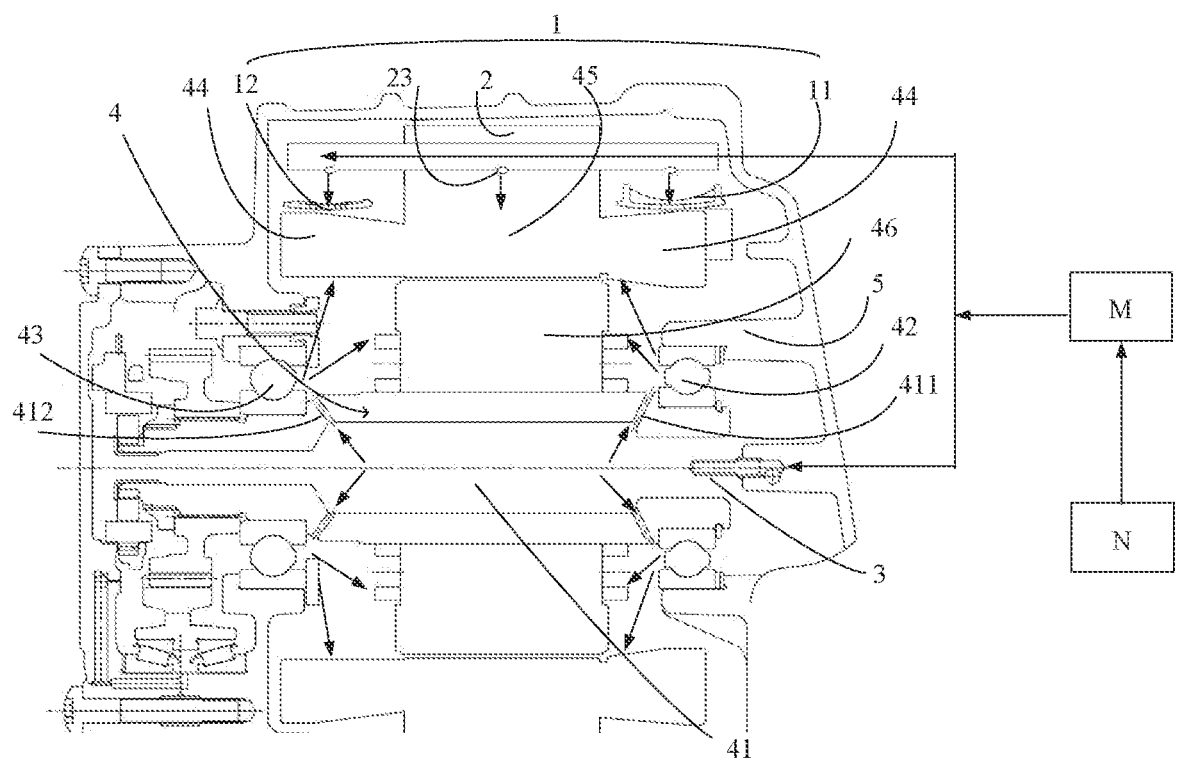
FIG. 5 is a schematic diagram of an operation principle of an oil-cooled motor cooling system according to some embodiments of the present disclosure.

As shown in FIG. 5, in the case that the cooling oil in an oil container of the transmission reaches a predetermined temperature of an oil injection opening of the motor by a cooling or warming function of an oil cooler N, the cooling oil is pumped to a hydraulic system of the transmission by the oil pump M and transmitted to the oil spraying pipe 2 and the oil guide pipe 3 through the oil passage on the transmission housing 5. That is, the oil-cooled motor cooling system in the embodiments of the present disclosure includes two oil cooling passages.

In a first oil cooling passage, the cooling oil at a flow rate is sprayed into the rotor shaft 41 through the oil guide pipe 3, the inside cooling oil is dumped in all directions by the rotated rotor shaft 41, and the dumped cooling oil is drizzled to the inner sides of the first bearing 42 and the second bearing 43 through the first oil dumping hole 411 and the second oil dumping hole 412, such that the first bearing 42 and the second bearing 43 are cooled. In addition, the cooling oil is rebounded to the inner side of the stator winding 44 and two sides of the rotor core 46 by the first bearing 42 and the second bearing 43, such that the inner side of the stator winding 44 and two sides of the rotor core 46 are cooled.

In a second oil cooling passage, the cooling oil flowed into the oil spraying pipe 2 has two flowing sub-passages. One part of the cooling oil flows into the straight pipe 21. As the straight pipe 21 spans over the first oil collection tray 11, the stator core 45, and the second oil collection tray 12, in the case that this part of the cooling oil flows and passes through a start end portion of the straight pipe 21, the cooling oil is sprayed to the semi-arc tray body on one side of the first oil collection tray 11 through the corresponding oil spraying hole 23 in the straight pipe 21, and then the part of the cooling oil is drizzled to the stator winding 44 below the semi-arc tray body on the one side through the through holes in the tray body, such that the end of the stator winding 44 is cooled. In the case that the cooling oil flows a center portion of the straight pipe 21, the cooling oil is directly sprayed to the stator core 45 through the corresponding oil spraying hole 23 in the straight pipe 21, such that the end of the stator core 45 is cooled. In the case that the cooling oil flows an end portion of the straight pipe 21, the cooling oil is sprayed to the semi-arc tray body on one side of the second oil collection tray 12 through the corresponding oil spraying hole 23 in the straight pipe 21, and then this part of the cooling oil is drizzled to the stator winding 44 below the semi-arc tray body at the one side through the through holes in the tray body, such that the end of the stator winding 44 is cooled.

The other part of the cooling oil flows into the bent pipe 22. As the first pipe 221 of the bent pipe 22 also spans over the first oil collection tray 11, the stator core 45, and the second oil collection tray 12, in the case that this part of the cooling oil flows and passes through a start end portion of the first pipe 221 of the bent pipe 22, the cooling oil is sprayed to the semi-arc tray body on the other side of the first oil collection tray 11 through the corresponding oil spraying hole 23 in the pipe body, and then this part of the cooling oil is drizzled to the stator winding 44 below the semi-arc tray body on the other side through the through holes in the tray body, such that the end of the stator winding 44 is cooled. In the case that the cooling oil flows a center portion of the first pipe 221 of the bent pipe 22, the cooling oil is directly sprayed to the stator core 45 through the corresponding oil spraying hole 23 in the pipe body, such that the end of the stator core 45 is cooled. In the case that the cooling oil flows an end portion of the first pipe 221 of the bent pipe 22, the cooling oil is sprayed to the semi-arc tray body on the other side of the second oil collection tray 12 through the corresponding oil spraying hole 23 in the pipe body, and then this part of the cooling oil is drizzled to the stator winding 44 below the semi-arc tray body on the other side through the through holes in the tray body, such that the end of the stator winding 44 is cooled.

Thus, the inner side and outer side of the stator winding, the rotor core, and the bearing are directly cooled by the oil-cooled motor cooling system, the cooling range is increased, and the cooling effect is improved.

By adopting the oil collection assembly, the oil spraying pipe, and the oil guide pipe, the oil-cooled motor cooling system in the embodiments of the present disclosure achieves the cooling of the inner side and outer side of the stator winding, the stator core, the rotor, two sides of the rotor shaft, and the inner side of the bearing by two oil cooling passages, and the cooling range is wide. The oil cooling passages are direct drizzling the cooling oil to corresponding assemblies of the motor, and thus the motor is cooled in time, the cooling effect is improved, and thus reduction of the efficiency of the motor and the effect on the lifetime of the motor caused by accumulation of the heat for long time are avoided. An amount of the cooling oil required to achieve the same cooling effect is less, the temperature of the injected cooling oil is not necessarily lower, and thus load of the oil cooler is reduced.

In the current water cooling mode, a volume and a weight of a water jacket are great, such that a weight and cost of the transmission are increased. However, structures of the oil collection assembly, the oil spraying pipe, and the oil guide pipe in the oil-cooled motor cooling system in the embodiments of the present disclosure are simple, a volume is less, and a weight is less, such that the weight of the transmission is not increased.

In addition, the water jacket is generally interference fit with the stator core. The interference fit is difficult and is prone to non-uniform heating, such that deformation of the stator core is not uniform. Thus, a magnetic field generated by the motor is affected, and the normal properties of the motor are affected. The oil collection assembly, the oil spraying pipe, and the oil guide pipe in the embodiments of the present disclosure are secured by the transmission housing, and thus the motor is not affected.

The embodiments of the present disclosure further provide a vehicle. The vehicle includes the above oil-cooled motor cooling system. By disposing the above oil-cooled motor cooling system, the motor is efficiently cooled, such that the operation efficiency of the motor is improved, and the property of the vehicle is further improved.

In the present disclosure, the terms "first," "second," "third," and the like are only used for the purpose of description and should not be construed as indicating or implying relative importance or implicitly indicating the number of technical features as indicated. Unless otherwise clearly defined, the expression "a plurality of" refers to two or more.

Described above are example embodiments of the present disclosure, and are not intended to limit the present disclosure. Any modifications, equivalent replacements, improvements and the like made within the spirit and principles of the present disclosure should be included within the scope of protection of the present disclosure.

The invention claimed is:

1. An oil-cooled motor cooling system, comprising:
a motor, an oil collection assembly, and
an oil spraying pipe;
wherein the oil spraying pipe is disposed over the oil collection assembly, a plurality of oil spraying holes with openings facing towards the oil collection assembly are arranged in the oil spraying pipe, and the oil spraying pipe is configured to spray cooling oil to the oil collection assembly through the plurality of oil spraying holes; and
wherein the oil collection assembly comprises a first oil collection tray and a second oil collection tray, wherein the first oil collection tray and the second oil collection tray are respectively disposed over a first end and a second end of a stator winding of the motor, each of the first oil collection tray and the second oil collection tray is in an arc shape matching the stator winding in shape, a plurality of first through holes are arranged in the first oil collection tray, a plurality of second through holes are arranged in the second oil collection tray, and the oil collection assembly is configured to cause the cooling oil sprayed from the oil spraying pipe to flow to the stator winding through the plurality of first through holes and the plurality of second through holes;
the first oil collection tray comprises a first arc tray body, two first arc side edges, and a plurality of first partition ribs, wherein the two first arc side edges are respectively disposed on two sides of the first arc tray body and protrude in a direction away from the stator winding, and the plurality of first partition ribs are evenly connected between the two first arc side edges, such that a plurality of first oil collection partitions are formed on the first arc tray body, wherein the plurality of first through holes are arranged in each of the plurality of first oil collection partitions; and
three first through holes are arranged in each of the plurality of first oil collection partitions, wherein an isosceles triangle is formed by connecting centers of the three first through holes, and two of the three first through holes are close to lower edges of the first oil collection partitions thereof.

2. The oil-cooled motor cooling system according to claim 1, wherein the oil spraying pipe comprises a straight pipe and a bent pipe; wherein
a first end of the straight pipe is closed, a second end of the straight pipe is opened, a first portion of the plurality of oil spraying holes are arranged in the straight pipe, and the straight pipe is parallel to an axis of the motor; and
wherein the bent pipe comprises a first pipe and a second pipe that are connected, wherein the first pipe is parallel to the straight pipe, an end, distal from the first pipe, of the second pipe is connected to the straight pipe, a second portion of the plurality of oil spraying holes are arranged in the first pipe, and an end, distal from the second pipe, of the first pipe is closed.

3. The oil-cooled motor cooling system according to claim 1, wherein the oil spraying pipe is made of a stainless steel.

4. The oil-cooled motor cooling system according to claim 1, wherein a width of the first oil collection tray matches a width of a portion, going beyond a stator core, of the first end of the stator winding, and a width of the second oil collection tray matches a width of a portion, going beyond the stator core, of the second end of the stator winding.

5. The oil-cooled motor cooling system according to claim 1,
wherein the second oil collection tray comprises a second arc tray body, two second arc side edges, and a plurality of second partition ribs, wherein the two second arc side edges are respectively disposed on two sides of the second arc tray body and protrude in a direction away from the stator winding, and the plurality of second partition ribs are evenly connected between the two second arc side edges, such that a plurality of second oil collection partitions are formed on the second arc tray body, wherein the plurality of second through holes are arranged in each of the plurality of second oil collection partitions.

6. The oil-cooled motor cooling system according to claim 1, wherein both a radian of the first oil collection tray and a radian of the second oil collection tray are 120 degrees.

7. The oil-cooled motor cooling system according to claim 5,
wherein three second through holes are arranged in each of the plurality of second oil collection partitions, wherein a second isosceles triangle is formed by connecting centers of the three second through holes, and two of the three second through holes are close to lower edges of the second oil collection partitions thereof.

8. The oil-cooled motor cooling system according to claim 5, wherein both the first oil collection tray and the second oil collection tray are respectively symmetric about arc centerlines of the trays.

9. The oil-cooled motor cooling system according to claim 5, wherein
two ends of the arc side edge, proximal to the second oil collection tray, of the first oil collection tray are respectively disposed with vertical first lugs, wherein the first lug is provided with a connection pipe; and
wherein two ends of the arc side edge, proximal to the first oil collection tray, of the second oil collection tray are respectively disposed with vertical second lugs, wherein the second lug is opposite to the first lug, and is provided with a connection pillar, wherein the connection pillar is inserted into the connection pipe.

10. The oil-cooled motor cooling system according to claim 9, wherein
two ends of the arc side edge, distal from the second oil collection tray, of the first oil collection tray are respectively disposed with plug-in pillars, wherein the plug-in pillar is suitable for interference fitting with a hole in a transmission housing; and
wherein a positioning portion is formed on a center of the arc side edge, distal from the first oil collection tray, of the second oil collection tray, wherein the positioning portion protrudes in a wavy shape in the direction away from the stator winding, and is suitable for contact with an inner wall of the transmission housing.

11. The oil-cooled motor cooling system according to claim 1, wherein both the first oil collection tray and the second oil collection tray are injection molded parts made of high temperature resistant materials.

12. The oil-cooled motor cooling system according to claim 1, further comprising: an oil guide pipe; wherein the oil guide pipe is conducted to an inner of a rotor shaft of the motor, and is configured to inject the cooling oil to the inner of the rotor shaft, wherein two ends of a shaft body of the rotor shaft of the motor are respectively disposed with a first oil dumping hole and a second oil dumping hole, wherein the first oil dumping hole is configured to dump cooling oil inside the rotor shaft to a first bearing supporting the rotor shaft, and the second oil dumping hole is configured to dump the cooling oil inside the rotor shaft to a second bearing supporting the rotor shaft, and wherein the first bearing and the second bearing are respectively proximal to two ends of the rotor shaft.

13. The oil-cooled motor cooling system according to claim 12, wherein an axis of the first oil dumping hole is aligned with the first bearing, and an axis of the second oil dumping hole is aligned with the second bearing.

14. The oil-cooled motor cooling system according to claim 12, wherein a plurality of first oil dumping holes and a plurality of second oil dumping holes are arranged, wherein the plurality of first oil dumping holes and the plurality of second oil dumping holes are respectively disposed around the shaft body of the rotor shaft.

15. A vehicle, comprising: an oil-cooled motor cooling system, wherein the oil-cooled motor cooling system comprises: a motor, an oil collection assembly, and an oil spraying pipe; wherein
the oil spraying pipe is disposed over the oil collection assembly, a plurality of oil spraying holes with openings facing towards the oil collection assembly are arranged in the oil spraying pipe, and the oil spraying pipe is configured to spray cooling oil to the oil collection assembly through the plurality of oil spraying holes; and
wherein the oil collection assembly comprises a first oil collection tray and a second oil collection tray, wherein the first oil collection tray and the second oil collection tray are respectively disposed over a first end and a second end of a stator winding of the motor, each of the first oil collection tray and the second oil collection tray is in an arc shape matching the stator winding in shape, a plurality of first through holes are arranged in the first oil collection tray, a plurality of second through holes are arranged in the second oil collection tray, and the oil collection assembly is configured to cause the cooling oil sprayed from the oil spraying pipe to flow to the stator winding through the plurality of first through holes and the plurality of second through holes;

the first oil collection tray comprises a first arc tray body, two first arc side edges, and a plurality of first partition ribs, wherein the two first arc side edges are respectively disposed on two sides of the first arc tray body and protrude in a direction away from the stator winding, and the plurality of first partition ribs are evenly connected between the two first arc side edges, such that a plurality of first oil collection partitions are formed on the first arc tray body, wherein the plurality of first through holes are arranged in each of the plurality of first oil collection partitions; and three first through holes are arranged in each of the plurality of first oil collection partitions, wherein an isosceles triangle is formed by connecting centers of the three first through holes, and two of the three first through holes are close to lower edges of the first oil collection partitions thereof.

16. The vehicle according to claim 15, wherein the oil spraying pipe comprises a straight pipe and a bent pipe; wherein a first end of the straight pipe is closed, a second end of the straight pipe is opened, a first portion of the plurality of oil spraying holes are arranged in the straight pipe, and the straight pipe is parallel to an axis of the motor; and wherein the bent pipe comprises a first pipe and a second pipe that are connected, wherein the first pipe is parallel to the straight pipe, an end, distal from the first pipe, of the second pipe is connected to the straight pipe, a second portion of the plurality of oil spraying holes are arranged in the first pipe, and an end, distal from the second pipe, of the first pipe is closed.

17. The vehicle according to claim 15, wherein the oil spraying pipe is made of a stainless steel.

18. The vehicle according to claim 15, wherein a width of the first oil collection tray matches a width of a portion, going beyond a stator core, of the first end of the stator winding, and a width of the second oil collection tray matches a width of a portion, going beyond the stator core, of the second end of the stator winding.

19. The vehicle according to claim 15,
wherein the second oil collection tray comprises a second arc tray body, two second arc side edges, and a plurality of second partition ribs, wherein the two second arc side edges are respectively disposed on two sides of the second arc tray body and protrude in a direction away from the stator winding, and the plurality of second partition ribs are evenly connected between the two second arc side edges, such that a plurality of second oil collection partitions are formed on the second arc tray body, wherein the plurality of second through holes are arranged in each of the plurality of second oil collection partitions.

20. The vehicle according to claim 15, wherein both a radian of the first oil collection tray and a radian of the second oil collection tray are 120 degrees.

* * * * *